July 25, 1939.  E. C. SAUERMAN  2,167,005
PREADDRESSED ENVELOPE
Filed Nov. 11, 1937
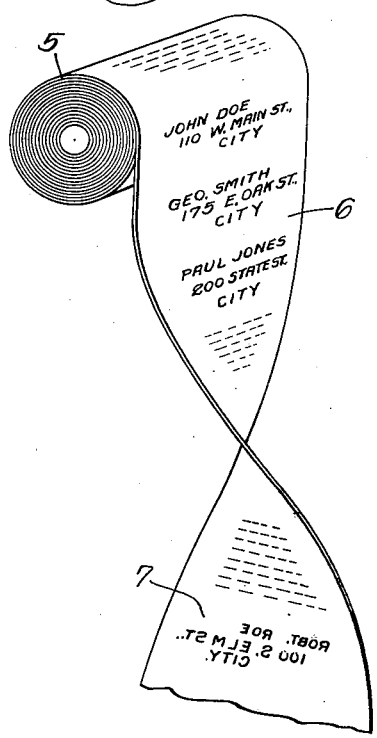
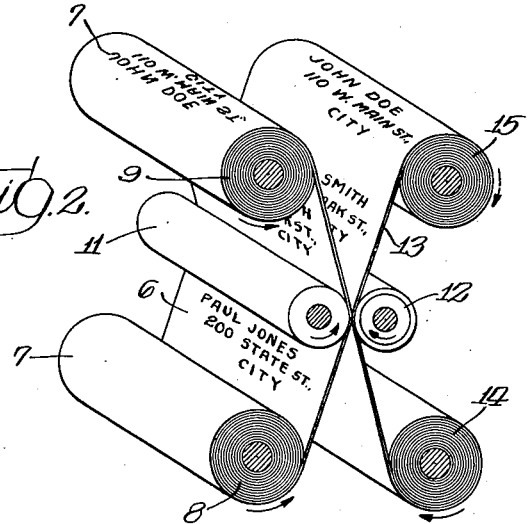
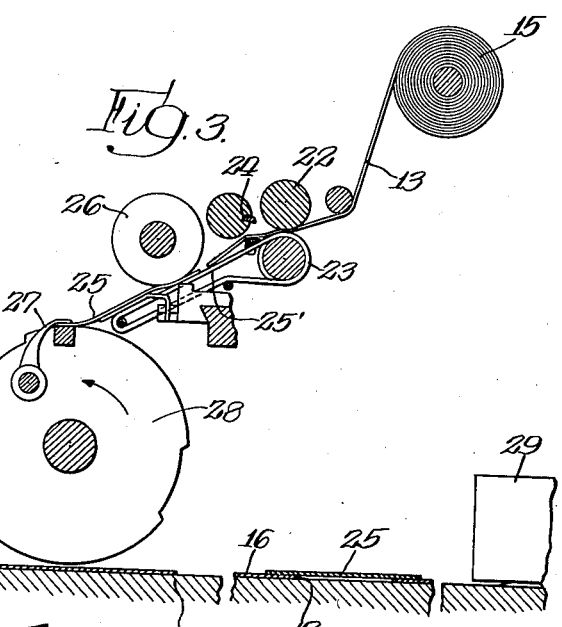
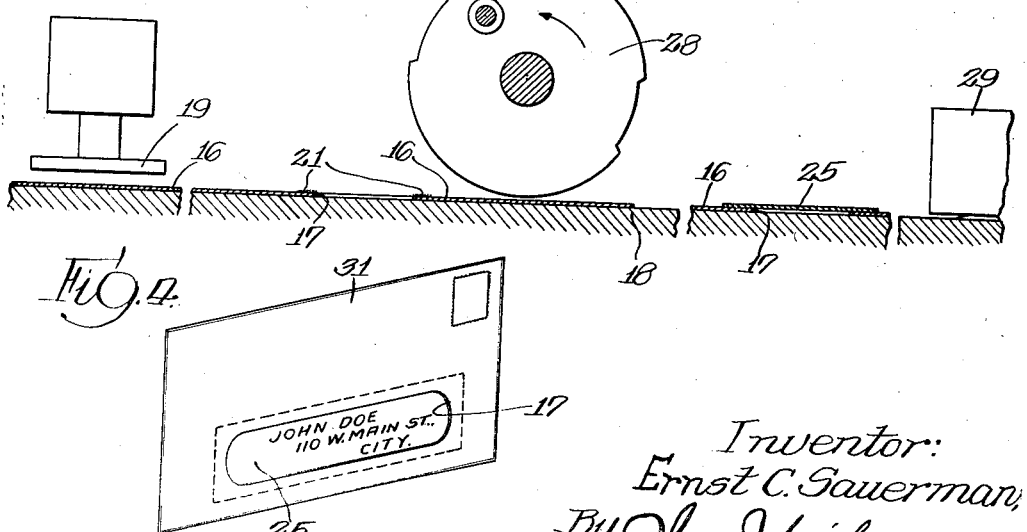
Inventor:
Ernst C. Sauerman,
By Chas J. Wilson atty.

Patented July 25, 1939

2,167,005

UNITED STATES PATENT OFFICE 2,167,005

PREADDRESSED ENVELOPE

Ernst C. Sauerman, Chicago, Ill.

Application November 11, 1937, Serial No. 174,050

5 Claims. (Cl. 229—71)

This invention relates to mailing envelopes, and its purpose is to apply to the envelopes during their manufacture the names and addresses of the recipients, thereby relieving the purchasers of the envelopes of the necessity of addressing them.

All large mail advertisers have one or more lists of names and addresses to whom their advertising is periodically sent, and these names and addresses necessarily have to be applied to the envelopes in which the advertising or other mail matter is forwarded through the mails. If the advertising is of that personal or semi-personal character which requires the name and address of the recipient upon the mailing matter itself, such names and addresses are customarily applied with a typewriter, and window envelopes through which the names and addresses are visible are usually employed, thereby obviating the necessity of repeating the name and address upon the envelope itself. Where the advertising is of a non-personal nature upon which the appearance of the name and address is not essential, the envelopes themselves are addressed on a typewriter or on an addressing machine. The addressing of envelopes in large numbers in either of these ways involves considerable labor and expense, thereby adding materially to the cost of the advertising program.

The primary purpose of my present invention is to provide envelope users with pre-addressed envelopes at a cost very slightly in excess of the cost of unaddressed envelopes so that a major portion of the expense of addressing the envelopes and all of the time and annoyance of so doing is saved to the envelope users.

The saving is even more substantial in cases where an advertising campaign involves the sending of several follow-up mailings to the same recipients. In such instances each mailing to a list of customers or prospects involves the addressing of each individual envelope. Consequently, if the plan contemplates six consecutive mailings to a certain list, six envelopes are required to be addressed to each name on the list before the campaign is completed. In accordance with my present invention as many as six envelopes may be addressed in duplicate at an addressing cost of only slightly more than the cost of addressing one of said envelopes.

By relieving the envelope user of the necessity of providing envelope addressing labor, floor space for their accommodation, and of an investment in addressing machinery of whatever type employed, my invention, which enables the user to purchase envelopes already addressed at a cost only slightly greater than that of unaddressed envelopes, affords a saving in expense which is very substantial indeed.

For the purpose of facilitating an understanding of my invention, I have illustrated on the accompanying drawing somewhat schematically a method for producing envelopes in accordance with my invention.

Referring to the drawing,

Fig. 1 is a perspective view of an address-bearing master strip;

Fig. 2 is a similar view illustrating the step of transferring or producing duplicate strips of addresses from the master strip;

Fig. 3 is a fragmentary view illustrating one method of applying the addresses to the envelope blanks; and Fig. 4 is a face view of an envelope produced in accordance with my invention.

In accordance with the plan contemplated by my invention, the envelope user furnishes to the manufacturer the names and addresses of the recipients to whom the envelopes containing the desired mailing matter are to be sent. The manufacturer reproduces this list by means of a special typewriter upon a strip of paper or the like, and by the use of a special carbon paper faced against the back of the strip when the names and addresses are written thereon such names and addresses appear in reverse on the back of the strip. This strip which is known as the master strip is designated on the drawing by reference character 5, the front of the strip upon which the addresses appear as they are written upon the typewriting machine being indicated by reference character 6, and the back of the strip upon which the addresses appear in reverse being indicated by reference character 7. From this illustration, it will be apparent that the names and addresses are written on the strip in spaced relation for a purpose which will later appear.

While it was stated above that this master strip would be made up by the envelope manufacturer from the list of names and addresses furnished by the envelope purchaser, it will be manifest that the strip might be made up by the purchaser instead, if preferred, and furnished to the manufacturer.

The master strip when made up on a special typewriting machine is wound from one roll on to another, and the roll upon which it is disposed when completed is indicated in Fig. 2 by reference character 8, the back 7 of the strip being faced outwardly on the roll. This roll is then placed in a transferring or duplicating machine of any preferred construction adapted to wind the master strip from the roll 8 on to a roll 9 between adjustable pressure rolls 11 and 12, between which is also simultaneously fed another strip of paper or similar material 13 adapted to receive, as it passes between the pressure rolls, impressions of the addresses from the back of the master strip. The duplicate strip 13 is fed from a roll 14 on to a roll 15, and after passing between the pressure rollers in contact with the back face of the master strip becomes a duplicate of, or in other words, carries duplicates of the names and addresses with which the master strip was provided.

The character of the master strip is such that a number of impressions as high as a half dozen or more can be taken from it. Consequently, any desired number of duplicate strips 13 may be made from the master strip by simply running these strips through the transfer machine in cooperative relation to the master strip. In follow-up advertising where a number of mailings are planned to each of the addresses, a corresponding number of duplicate strips 13 will be made up from the master strip.

A duplicate strip 15 is then transferred to an envelope-making machine of the character adapted to gum and fold previously cut envelope blanks. The blanks, as is well-known in the envelope making art, are cut from paper stock to produce an envelope body of the desired size with integral flaps which when folded over and gummed together form a completed envelope. Since my invention is concerned with what is known as window envelopes, the envelope blanks designated in Fig. 3 of the drawing by reference character 16 have been, when cut to shape, also cut to provide each with a window opening 17. These blanks, as is customary, are fed in succession along the bed 18 of an envelope-making machine by any suitable mechanism, and as they pass a gumming device 19, gum 21 is applied to the upper face of each blank around the margin of the window opening.

Simultaneously, the duplicate strip 13 is fed by suitable feed rolls 22 and 23 from the roll 15, past a revolving cutter 24 by which the strip is severed transversely midway between the addresses appearing thereon into individual slips 25 each bearing a name and address. From the cutter 24 the slips are fed in succession by a belt conveyor 25' and a roll 26 into the holding jaw 27 of an applicator roll 28 by which each slip is applied directly over a window opening 17 of an envelope blank 16, and as the envelope blank is moved onward with the address slip imposed thereon, pressure is applied by suitable mechanism such as the perimeter of the roll 28 or independent pressure rolls to press the slip firmly against the gummed margins of the window opening so that the slip will be securely and permanently attached to the envelope blank around the window opening. In Fig. 3 of the drawing, the upper face of the blank 16 becomes the inside of the envelope. Consequently, the slip 25 is applied to the blank with the printed address thereon downwardly disposed so that it will be presented to view on the outside of the envelope.

After each blank has had an address-bearing slip attached thereto in the manner described or by means of a reciprocatory applicator, if preferred, and after certain flaps of the blank have been gummed in the usual manner, the blank is folded by mechanism indicated generally by reference character 29 to overlap and gum together certain of the flaps so as to produce a completed envelope, leaving one gummed flap unsealed to provide an opening through which the mailing matter may be introduced into the envelope, which opening may then be closed through the instrumentality of the flap to retain the mailing matter in the envelope.

It will be apparent that by this method I am able to produce pre-addressed envelopes which, as they come from the manufacturer, are ready to receive the mailing matter and be deposited in the mails without the necessity of being subjected to an addressing operation. The envelopes present the appearance of an ordinary commercial window envelope in which the address appears through the window but is written on the mailing matter. In this instance, however, the address instead of being on the mailing matter is carried by a slip permanently attached to the inner face of the envelope itself and entirely independent from the mailing matter which will be inserted into and removed from the envelope without in any way affecting the address which remains as a permanent part of the envelope.

The principal expense involved in my method is in the production of the master strip. The transferring of the addresses from this strip on to the duplicate strips, irrespective of the number of duplicates made, is very slight and the cost of severing the strip into slips and applying the slips to the envelope blanks does not exceed the cost of applying glassine to the opening of an ordinary window envelope. By my improved method, I am able, therefore, to furnish pre-addressed envelopes at a cost but little in excess of an ordinary envelope, and this excess is further diminished in inverse proportion to the number of duplicate lists required.

My invention is equally advantageous in envelopes of both large and small sizes, and is adapted to various styles of envelopes and to those having the window either at the front or the back of the completed envelope.

While I have illustrated and described a preferred sequence of operations in carrying out my method and have exemplified one type of finished envelope indicated generally on the drawing by reference character 31, it should be manifest that both the structure of the envelope and the details of the method of production may be varied within wide limits without departing from the essence of my invention as defined in the following claims:

I claim:

1. As a new article of manufacture, a complete pre-addressed envelope ready for use by a sender provided with an opening for the reception of mailing matter and having a flap adapted to cover said opening, one wall of said envelope being provided with a window opening and having a previously addressed slip permanently secured to the inner face of said windowed wall in position to present the address carried thereby to view through said window opening.

2. As a new article of manufacture, a complete pre-addressed mailing envelope ready for use by a sender adapted to receive and contain removable mailing matter, one wall of said envelope being provided with a window and having a slip bearing an address permanently secured to the inner face of said wall in position to present said address to view through said window.

3. As a new article of manufacture, a complete pre-addressed envelope ready for use by a sender adapted to contain mailing matter and provided with an opening through which said mailing matter may be introduced in the envelope and with a flap for retaining said mailing matter in the envelope, one wall of said envelope being provided with a window and having a slip bearing an address permanently secured to the inner face of said wall in position to present said address to view through said window.

4. As a new article of manufacture, a complete pre-addressed mailing article ready for use by a sender having one wall provided with a window opening and having a previously addressed slip permanently secured to the inner face of said windowed wall in position to present the address carried thereby to view through said window opening.

5. As a new article of manufacture, a complete pre-addressed mailing container for use by a sender comprising a folded body having a window opening in one wall thereof, and a slip bearing a previously applied address secured to the inner face of said wall around said opening so as to present said address to view through said opening as if borne by removable contents of the container, said slip being fixedly attached to said wall to constitute a permanent component of the container structure.

ERNST C. SAUERMAN.